United States Patent [19]

Willis

[11] Patent Number: 5,137,177
[45] Date of Patent: Aug. 11, 1992

[54] DISPENSING TUBE WITH TUBEWALL RIBS AND REAR SPHERICAL PLUNGER BALL

[76] Inventor: Dale R. Willis, 4652 S. 3900 W., Roy City, Utah 84067

[21] Appl. No.: 667,713

[22] Filed: Mar. 11, 1991

[51] Int. Cl.$^5$ .............................................. G01F 11/00
[52] U.S. Cl. ........................................ 222/1; 222/215; 222/386; 604/213
[58] Field of Search ................. 222/1, 92, 107, 206, 222/214, 215, 386, 391; 604/188, 212, 213, 216, 217; 401/176; 206/277, 817; 220/43; 221/229, 279, 64, 65

[56] References Cited

U.S. PATENT DOCUMENTS

| | | | |
|---|---|---|---|
| 738,009 | 9/1903 | Dews | 604/212 |
| 811,272 | 1/1906 | Belcher | 401/176 |
| 2,361,647 | 10/1944 | Nyden | 222/92 |
| 2,880,913 | 4/1959 | Peyron | 222/386 |
| 3,326,420 | 4/1965 | Turner | 222/103 |
| 3,521,795 | 7/1970 | Langhjelm et al. | 222/386 |
| 3,974,943 | 8/1976 | Wilston | 222/103 |
| 4,015,750 | 4/1977 | Wilston | 222/103 |

FOREIGN PATENT DOCUMENTS

| | | | |
|---|---|---|---|
| 1959349 | 6/1971 | Fed. Rep. of Germany | 222/92 |
| 1217436 | 5/1960 | France | 222/386 |
| 665461 | 6/1964 | Italy | 222/386 |
| 2182053 | 8/1987 | Japan | 222/386 |
| 459875 | 9/1968 | Switzerland | 222/386 |
| 2062767 | 5/1981 | United Kingdom | 222/107 |

*Primary Examiner*—Michael S. Huppert
*Assistant Examiner*—Philippe Derakshani
*Attorney, Agent, or Firm*—Fredric L. Sinder; Donald J. Singer

[57] ABSTRACT

An improved flexible wall dispensing tube is disclosed. The tube has a plurality of circumferential ridges along its length and a spherical plunger ball mounted inside near its sealed end. The outside of the tube is squeezed from the rear to push forward the plunger ball which then uniformly pushes the tube contents ahead of it while significantly preventing leakage back past the ball. As the plunger ball is pushed, or softly clicked, past the inside vertex of each groove formed between ribs, a stepwise uniform amount of tube contents is pushed out of the tube.

3 Claims, 1 Drawing Sheet

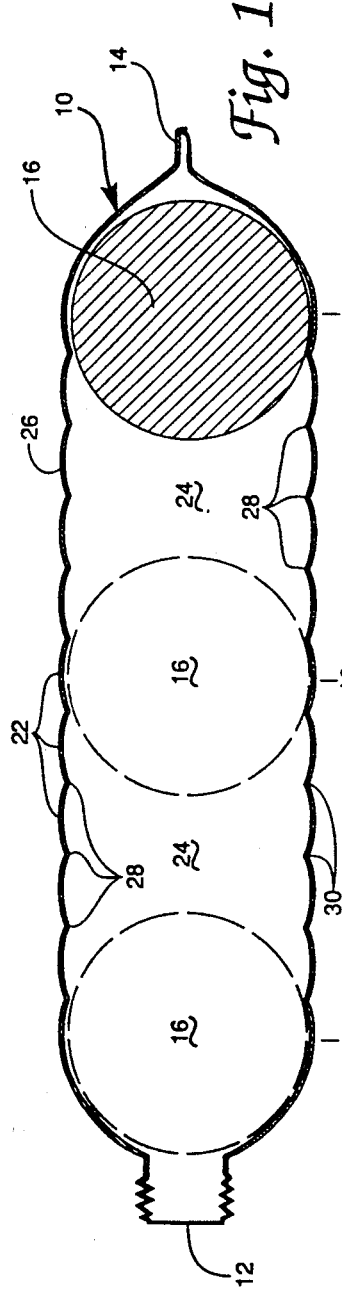
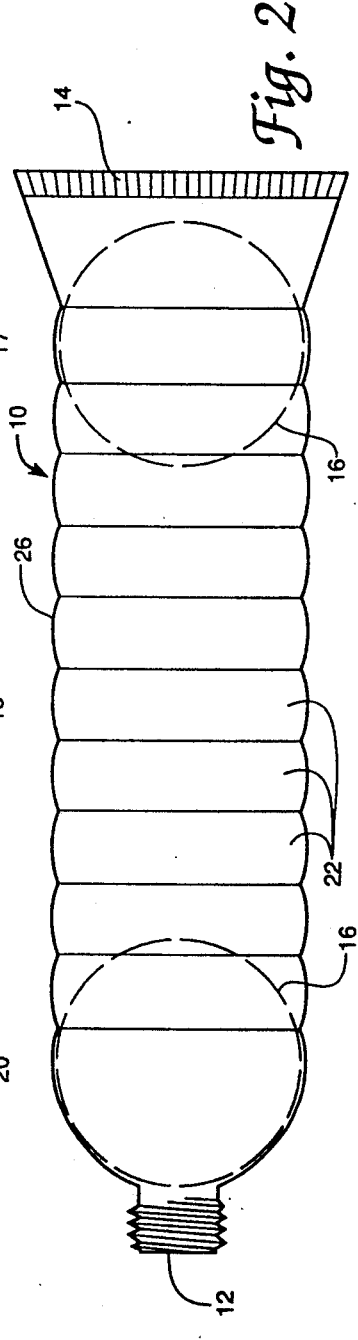
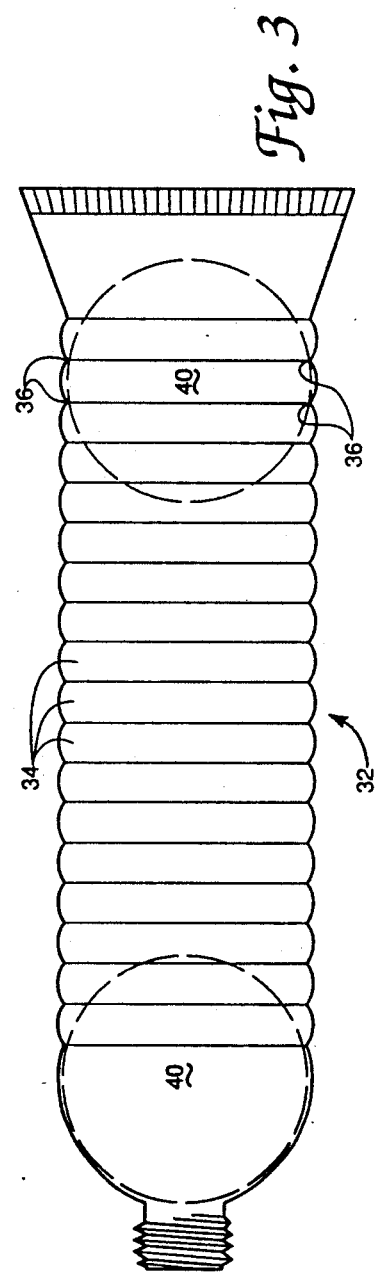

DISPENSING TUBE WITH TUBEWALL RIBS AND REAR SPHERICAL PLUNGER BALL

RIGHTS OF THE GOVERNMENT

The invention described herein may be manufactured and used by or for the Government of the United States for all governmental purposes without the payment of any royalty.

BACKGROUND OF THE INVENTION

The present invention relates generally to dispensing tubes, and more particularly to a dispensing tube which utilizes a combination squeezing and plunger action for dispensing its contents.

The problems with conventional squeezable dispensing tubes, such as are used for dispensing toothpaste, salves and other common substances, are well known. Their primary problem is the difficulty in getting the last bit of tube contents out of the tube. The general method for solving this problem is to squeeze from the rear of the tube to the front, while simultaneously trying to keep the tube contents from slipping back past the points where pressure is applied. This general method is both awkward and never completely successful, always leaving behind some waste. In the past, before plastic tubes began to replace flexible metal tubes, the tubes were often rolled from the rear to the front as the contents were dispensed. This rolling method was effective, but, as mentioned, works, if at all, only with older style metal tubes. Modern plastic tubes will generally not stay rolled and the tube contents soon spread back again toward the rear of the tube.

The prior art includes various accessory tube holders in which a collapsible tube can be mounted and include a wedge-shaped press member for applying an uniform pressure to the outside of the tube from the rear to their front. These holders are generally wall-mounted and interfere with the desirable flexibility otherwise expected from a tube dispenser.

A recent partial response to the problem of getting out the last of the tube contents, at least for toothpastes, has been pump-type dispensers. While an improvement, such pump dispensers still leave some waste and are both more expensive and less convenient than tube dispensers.

It is, therefore, a principal object of the present invention to provide a dispensing tube that preserves the ease of use and convenience of tube dispensers while eliminating waste.

It is another object of the present invention to provide a dispensing tube that is both more convenient and easier to use than conventional squeezable tube dispensers.

It is a feature of the present invention that it can stepwise dispense predetermined amounts of tube contents.

It is another feature of the present invention that it reduces oozing of tube contents when a tube cap is left off.

It is an advantage of the present invention that it places less stress on the tube walls than conventional squeezable tube dispensers, thus allowing the use of thinner and lower cost material.

It is another advantage of the present invention that its manufacture will be straightforward and can be performed largely using existing manufacturing methods and equipment.

These and other objects, features and advantages of the present invention will become apparent as the description of certain representative embodiments proceeds.

SUMMARY OF THE INVENTION

The present invention provides a flexible wall dispensing tube that dispenses its contents with little or no waste. The unique discovery of the present invention is that a spherical plunger ball placed inside the rear of a flexible wall dispensing tube can be forced forward to push the contents out of the tube with little or no waste. An additional discovery is that molded ribbing in the flexible walls provides both improved sealing of the plunger ball to the inside tube walls and a means for stepwise dispensing of predetermined volumes of the tube contents.

Accordingly, the present invention is directed to a dispensing tube, comprising a tube of flexible material having an open end, a sealed end and a spherical plunger inside the tube. A plurality of circumferential ribs or inwardly-directed impressions may extend along the length of the tube. The tube material surrounding the open end may be conformably shaped to partially surround the spherical plunger.

The invention is also directed to a method for dispensing the contents of a flexible wall dispensing tube having an open end and a sealed end, comprising the steps of providing a spherical plunger inside the tube near its sealed end and applying pressure through the flexible wall to push the spherical plunger toward the tube open end so that the tube contents are pushed forward of the spherical plunger toward the open end. A plurality of circumferential ribs may extend along the length of the tube and the spherical plunger pushed stepwise past the inside vertex of each groove formed between ribs to dispense a predetermined volume of the tube contents with each stepwise movement.

DESCRIPTION OF THE DRAWINGS

The present invention will be more clearly understood from a reading of the following detailed description in conjunction with the accompanying drawings wherein:

FIG. 1 is a cross-sectional side view of a flexible wall dispensing tube according to the teachings of the present invention showing its spherical plunger;

FIG. 2 is a top view of the flexible wall dispensing tube of FIG. 1 showing its circumferential ribbing; and, FIG. 3 is a top view of a flexible wall dispensing tube according to the teachings of the present invention having more and smaller ribs.

DETAILED DESCRIPTION

Referring now to FIG. 1 of the drawings, there is shown a cross-sectional side view of a flexible wall dispensing tube 10 according to the teachings of the present invention. Tube 10 has an opening 12 at one end and a seal 14 at the other. A spherical plunger ball 16 is shown in solid lines at its start, or filled-tube, position 17 in front of seal 14 and in dashed lines at intermediate position 18 and end, or empty-tube, position 20. FIG. 2 is a top view of flexible wall dispensing tube 10 showing its circumferential ribs 22.

In its initial filled state, tube contents 24 occupy the space inside the tube in front of plunger ball 16. The space behind plunger ball 16 is contemplated to be an empty air void. In use, the outside of tube 10 is squeezed in a conventional manner from the rear to push forward plunger ball 16. Plunger ball 16 uniformly pushes tube contents 24 ahead of it while significantly preventing leakage of contents 24 back past it. Plunger ball 16 is sized to fit snugly, inside tube 10. The wall material 26 of tube 10 is sufficiently resilient so that plunger ball 16 softly clicks past the vertices 28 of each inside groove 30 formed between adjacent ribs 22. The roughly spherical inside surface of each rib 22 then closes over the spherical outer surface of plunger 16 to reseal around it. Each forward click movement of plunger 16 will press out of opening 12 an equal amount of contents 24. The open end of tube 10 is conformably shaped to accommodate plunger ball 16 nearly exactly so that no tube contents are wasted. Conventional tubes nearly always waste at least a small cone shaped amount of tube contents directly behind the tube opening.

When plunger 16 is moved forward, the flexible walls of tube 10 will either conformably close behind plunger 16 to fill the thus created mild vacuum, or the empty space behind plunger 16 will fill with air from either porosity of the wall material or through a small opening in the rear of tube 10 provided for that purpose.

Circumferential ribs 22 are shown slightly wider and in fewer number than may prove most practical in commercial use. FIG. 3 is a top view of a flexible wall dispensing tube 32 having more and smaller circumferential ribs 34. Smaller ribs 34—for delivering, for example, smaller unit amounts of tube contents—could have the radius of their arcs changed to maintain the rough seal between the inside curvature of the ribs and the outside curvature of the plunger ball. This may not be practical in all cases, but is not a critical requirement because, in most cases, the curvature will not have to perfectly match and will not have to be perfectly leakproof. Sufficient sealing will occur along the two parallel circularly-shaped lines of contact 36 between adjacent groove inside vertices 38 and the outside surface of a plunger ball 40.

Ribs 34, and their accompanying grooves and opposing groove inside vertices, may be replaced by functionally equivalent molded impressions on the inside of the tube while retaining a smooth outer surface. This may be desirable either to accommodate manufacturing needs or to modify the variety of ways in which the invention may be used in practice, in that the use of an ribbed embodiment may include an accordion-type squeezing action which may not be desirable for all applications. In any case, ribs, or any functionally equivalent inside impressions, also work to hold plunger ball 40 in place after a desired amount of tube contents have been dispensed. This, by suction in front of plunger 40, and other mechanical effects, helps prevent oozing out of the tube contents should the opening be left uncovered. Because some substances, because of high viscosity or for other reasons, do not ooze, in some applications the ribs will not be needed.

Plunger ball 40 may be made solid or hollow and may be made slightly oversize for better sealing. Those with skill in the art will readily see that routine experimentation will reveal a variety of useful different modes of operation of the invention according to different combinations of ribbing, molded inside impressions, ball weight and size and other parameters.

The disclosed dispensing tube and its method for using successfully demonstrates the use of an inside plunger ball and conforming circumferential ribs to both avoid waste and to provide a means for stepwise delivery of the tube contents. Although the disclosed method is specialized, its teachings will find application in other areas where liquid, semi-liquid or semi-solid substances are moved through apparatus.

It is understood that various modifications to the invention as described may be made, as might occur to one with skill in the field of the invention, within the scope of the claims. Therefore, all embodiments contemplated have not been shown in complete detail. Other embodiments may be developed without departing from the spirit of the invention or from the scope of the claims.

I claim:

1. A dispensing tube, comprising:
   (a) a tube of flexible material having an open end and a sealed end;
   (b) a spherical plunger inside the tube; and,
   (c) a plurality of inwardly-directed fully-encircling circumferential impressions along the length of the inside of the tube wherein adjacent impressions engage the plunger at predetermined locations along the length of the tube for dispensing a predetermined volume of contents.

2. The dispensing tube according to claim 1, wherein the tube material surrounding the open end is conformably shaped to partially surround the spherical plunger.

3. A method for dispensing the contents of a flexible wall dispensing tube having an open end and a sealed end, comprising the steps of:
   (a) providing a spherical plunger inside the tube near its sealed end;
   (b) providing a plurality of inwardly-directed fully-encircling circumferential impressions along the length of the tube;
   (c) applying pressure through the flexible wall of push the spherical plunger stepwise past the vertex of each inwardly-directed impression toward the tube open end so that the tube contents are pushed forward of the spherical plunger toward the open end to dispense a predetermined volume of contents with each stepwise push.

* * * * *